US012558999B2

(12) United States Patent
Kim et al.

(10) Patent No.: US 12,558,999 B2
(45) Date of Patent: Feb. 24, 2026

(54) POWER SWIVEL DEVICE FOR SEAT

(71) Applicants: Hyundai Motor Company, Seoul
(KR); Kia Corporation, Seoul (KR);
DAS CO., LTD, Gyeongsangbuk-do
(KR)

(72) Inventors: Sang Ho Kim, Incheon (KR); **Byung
Yong Choi, Gyeonggi-do (KR); So
Young Yoo, Gyeonggi-do (KR); Ji
Hwan Kim, Seoul (KR); Sang Uk Yu**,
Seoul (KR); Dong Woo Kim, Seoul
(KR); Young Joon Kim, Gyeonggi-do
(KR); Jae Ho Kim, Gyeonggi-do (KR);
Duck Yeol Kim, Gyeonggi-do (KR);
Ho Jin Jung, Gyeonggi-do (KR)

(73) Assignees: Hyundai Motor Company, Seoul
(KR); Kia Corporation, Seoul (KR);
DAS CO., LTD, Gyeongsangbuk-do
(KR)

( * ) Notice: Subject to any disclaimer, the term of this
patent is extended or adjusted under 35
U.S.C. 154(b) by 247 days.

(21) Appl. No.: 18/236,690

(22) Filed: Aug. 22, 2023

(65) Prior Publication Data

US 2024/0343168 A1     Oct. 17, 2024

(30) Foreign Application Priority Data

Apr. 11, 2023     (KR) ........................ 10-2023-0047487

(51) Int. Cl.
*B60N 2/14*          (2006.01)
*B60N 2/02*          (2006.01)
(Continued)

(52) U.S. Cl.
CPC ........... *B60N 2/14* (2013.01); *B60N 2/02253*
(2023.08); *B60N 2/0742* (2013.01); *B60N
2/2869* (2013.01);
(Continued)

(58) Field of Classification Search
CPC ...... B60N 2/14; B60N 2/0742; B60N 2/2869;
B60N 2/304; B60N 2/933; H02K 7/116;
H02K 7/1163; H02K 7/1166
See application file for complete search history.

(56) References Cited

U.S. PATENT DOCUMENTS 6,104,112 A * 8/2000 Vanjani .................. H02K 7/116
310/67 R
7,108,325 B2 9/2006 Williamson et al.
(Continued)

FOREIGN PATENT DOCUMENTS

KR      10-2148820 B1     8/2020
KR      10-2475848 B1     12/2022
(Continued)

*Primary Examiner* — Syed A Islam
(74) *Attorney, Agent, or Firm* — Fox Rothschild LLP

(57) ABSTRACT

A power swivel device for a vehicle seat is configured to
perform both swivel and monopost functions of the vehicle
seat. The power swivel device includes a motor configured
to swivel the seat and a reduction gear device configured to
increase output torque of the motor, which are stacked in a
vertical direction on a bottom of the seat. The power swivel
device includes a lower housing; an upper housing stacked
on and assembled to the lower housing; an eccentric shaft
rotatably disposed relative to the lower housing and the
upper housing; a motor driving unit mounted between the
lower housing and the eccentric shaft; the reduction gear
device installed between the upper housing and the eccentric
shaft; and a swivel plate rotatably mounted on the reduction
gear device and connected to a seat cushion frame.

19 Claims, 8 Drawing Sheets

(51) Int. Cl.

| | |
|---|---|
| *B60N 2/07* | (2006.01) |
| *B60N 2/28* | (2006.01) |
| *B60N 2/30* | (2006.01) |
| *B60N 2/90* | (2018.01) |
| *H02K 7/116* | (2006.01) |

(52) U.S. Cl.

CPC .............. *B60N 2/304* (2013.01); *B60N 2/933* (2018.02); *H02K 7/116* (2013.01)

(56) References Cited

U.S. PATENT DOCUMENTS

| | | | |
|---|---|---|---|
| 7,364,234 B2 | 4/2008 | Begin et al. | |
| 7,735,917 B2 | 6/2010 | Jones et al. | |
| 9,242,581 B2 | 1/2016 | Farooq et al. | |
| 10,060,509 B2 * | 8/2018 | Liang ................... | H02K 1/2706 |
| 10,336,215 B2 | 7/2019 | Sowinski et al. | |
| 11,984,793 B2 * | 5/2024 | Park .......................... | B60N 2/14 |

| | | | |
|---|---|---|---|
| 2007/0209857 A1 * | 9/2007 | Wolf ................... | B60N 2/02246 180/315 |
| 2020/0223379 A1 | 7/2020 | Kikkawa | |
| 2021/0170921 A1 | 6/2021 | Seibold et al. | |
| 2022/0161694 A1 | 5/2022 | Numajiri et al. | |
| 2022/0203869 A1 * | 6/2022 | Feng ................... | B60N 2/02246 |
| 2022/0348114 A1 * | 11/2022 | Lee ..................... | B60N 2/02246 |
| 2023/0166642 A1 * | 6/2023 | Mikasa ................... | B60N 2/168 296/65.01 |
| 2023/0261544 A1 * | 8/2023 | Kim ...................... | H02K 7/1166 310/83 |
| 2023/0369939 A1 * | 11/2023 | Kim ....................... | H02K 7/116 |
| 2024/0154494 A1 * | 5/2024 | Kim ....................... | H02K 7/003 |
| 2024/0227633 A1 * | 7/2024 | Park ....................... | B60N 2/146 |
| 2024/0308404 A1 * | 9/2024 | Jayapalan ................ | B60N 2/14 |

FOREIGN PATENT DOCUMENTS

| | | |
|---|---|---|
| KR | 10-2530200 B1 | 5/2023 |
| WO | 2012/134448 A1 | 10/2012 |
| WO | 2020/109626 A1 | 6/2020 |

* cited by examiner

POWER SWIVEL DEVICE FOR SEAT

CROSS-REFERENCE TO RELATED APPLICATION

This application claims under 35 U.S.C. § 119 (a) the benefit of Korean Patent Application No. 10-2023-0047487, filed on Apr. 11, 2023, the entire contents of which are incorporated herein by reference.

BACKGROUND

(a) Technical Field

The present disclosure relates to a power swivel device for a vehicle seat, more particularly, to the power swivel device for the vehicle seat capable of performing a mono-post function and a swivel function of the vehicle seat.

(b) Description of the Related Art

In conjunction with autonomous or semi-autonomous vehicles, a seat is being developed with various mechanisms to enable conversation and meeting between occupants, relaxation and sleeping, assistance in entering and exiting the vehicle, etc.

For example, a swivel seat may allow rotation of a seat in a desired direction in order to support multi-party meetings and conversations, external scenery viewing, relaxation and sleeping, assistance in entering and exiting the vehicle, and the like.

Generally, a swivel seat refers to a seat having a swivel device installed at a bottom of the seat and configured to perform a predetermined mechanical function.

However, an existing swivel device has a disadvantage in that it is installed at the bottom of the seat in a state where a swivel structure and a driving unit are separated from each other, and in addition, is designed to evenly distribute a passenger load, which may result in an excessive increase in volume and packaging area of the swivel device.

In addition, due to increase in volume and packaging area of the existing swivel device, an available area for a floor panel in the vehicle interior corresponding to the bottom of the seat is reduced, which leads to space limitations. Accordingly, various convenience devices having different functions, such as a mobile console, may not be further installed on the floor panel in the vehicle interior.

Furthermore, a driving unit of the existing swivel device includes a power transmission device in which a plurality of gears are combined. In this case, when the seat is stopped during swivel operation, seat movement and noise may be generated due to gear backlash of the power transmission device during swivel operation of the seat.

Meanwhile, in an electric vehicle, since a battery module is installed at a bottom of a floor panel, a height of the floor panel increases as much as a height of the battery module. Accordingly, a seat supported by a monopost is applied in the vehicle interior in order to solve space and height restrictions of the floor panel for seat installation.

The monopost connects a bottom of a slim seat to the floor panel so as to support a seat load and a passenger load, and the same provides advantages such as flattening the floor panel and increasing the available area of the floor panel.

However, since the existing monopost connecting the bottom of the seat to the floor panel is too small in volume and cross-sectional area, additional devices such as a seat swivel device and a seat height adjustment device may not be installed on the existing monopost.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a power swivel device for a vehicle seat configured not only to reliably perform a swivel function of the vehicle seat but also to perform a monopost function of the vehicle seat by allowing a motor driving unit configured to drive a motor to swivel the vehicle seat and a reduction gear device configured to increase output torque of the motor driving unit to be stacked in the vertical direction on a bottom of the vehicle seat.

In one aspect, the present disclosure includes a power swivel device for a vehicle seat including a lower housing; an upper housing stacked on and assembled to the lower housing; an eccentric shaft rotatably disposed relative to the lower housing and the upper housing; a motor driving unit mounted between the lower housing and the eccentric shaft; the reduction gear device installed between the upper housing and the eccentric shaft; and a swivel plate rotatably mounted on the reduction gear device and connected to a seat cushion frame.

In another aspect, a vehicle comprises the power swivel device.

In a further aspect, the present disclosure provides a power swivel device for a seat, the power swivel device including a lower housing, an upper housing stacked on and assembled to the lower housing, an eccentric shaft rotatably disposed at a central portion of the lower housing and the upper housing, a motor driving unit mounted between the lower housing and the eccentric shaft, a reduction gear device installed between the upper housing and the eccentric shaft, and a swivel plate having a lower portion rotatably mounted on an output part of the reduction gear device and an upper portion connected to a seat cushion frame.

In a preferred embodiment, the eccentric shaft may include a cylindrical body, a circular part formed at an uppermost end of the cylindrical body, a first eccentric part formed to be integrated with an outer diameter portion of the cylindrical body and located below the circular part, and a second eccentric part formed to be integrated with the outer diameter portion of the cylindrical body and located below the first eccentric part.

In another preferred embodiment, the first eccentric part may be formed to be eccentric in one direction from a central portion of the cylindrical body, and the second eccentric part may be formed to be eccentric in the other direction from the central portion of the cylindrical body.

In still another preferred embodiment, the first eccentric part may have a first sleeve bearing inserted into an outer diameter portion of the first eccentric part, the second eccentric part may have a second sleeve bearing inserted into an outer diameter portion of the second eccentric part, and the circular part may have a third sleeve bearing inserted into an outer diameter portion of the circular part.

In yet another preferred embodiment, the motor driving unit may include a motor mounted in the lower housing, a worm mounted on an output shaft of the motor, and a worm wheel mounted on an outer diameter portion of a lower end of the eccentric shaft and engaged with the worm.

In still yet another preferred embodiment, the reduction gear device may include a first external gear inserted into and coupled to a first eccentric part of the eccentric shaft, a second external gear inserted into and coupled to a second eccentric part of the eccentric shaft, and an internal gear formed on an inner diameter portion of the upper housing and engaged with the first external gear and the second external gear.

In a further preferred embodiment, the first external gear inserted into and coupled to the first eccentric part and the second external gear inserted into and coupled to the second eccentric part may be stacked and coupled eccentrically to each other so that a portion at which the first external gear is engaged with the internal gear and a portion at which the second external gear is engaged with the internal gear are different from each other.

In another further preferred embodiment, the first external gear may have a plurality of first coupling holes formed therein, and the second external gear may have a plurality of second coupling holes formed therein. The first coupling holes and the second coupling holes may match each other in a vertical direction, and the first coupling holes and the second coupling holes may have hollow fixation pins respectively inserted thereinto and coupled thereto.

In still another further preferred embodiment, the hollow fixation pins may have rotation transmission pins respectively inserted thereinto and coupled thereto, and the rotation transmission pins may respectively have upper ends arranged so as to protrude upwards from the first external gear.

In yet another further preferred embodiment, the upper housing may have a ring-shaped support plate mounted on a lower surface of the upper housing and configured to support a bottom of the second external gear, wherein the support plate may be spaced apart from an outer diameter portion of the eccentric shaft by a predetermined distance.

In still yet another further preferred embodiment, a second ball bearing may be mounted between the outer diameter portion of the eccentric shaft and an inner diameter portion of the support plate.

In a still further preferred embodiment, the support plate may have a second support end formed to be integrated with the inner diameter portion of a lower end of the support plate and configured to support a bottom of the second ball bearing.

In a yet still further preferred embodiment, the swivel plate may have a rotation transmission groove formed on a lower surface of the swivel plate and configured to allow an upper end of a rotation transmission pin to be inserted thereinto and coupled thereto, and the rotation transmission pin may be formed to protrude upwards from a first external gear of the reduction gear device.

In a yet preferred embodiment, the swivel plate may have a lower cover mounted on the lower surface of an edge portion of the swivel plate and configured to rotatably contact an upper surface of the upper housing.

In a yet further preferred embodiment, a first ball bearing configured to guide rotation of the swivel plate and rotation of the lower cover may be mounted between inner diameter portions of the swivel plate and the lower cover and an outer diameter portion of the upper housing.

In yet another further preferred embodiment, the lower cover may have a first support end formed to be integrated with the inner diameter portion of a lower portion of the lower cover and configured to support a lower surface of the first ball bearing.

In additional aspects, vehicles are provided that comprise a seat and seat assembly as disclosed herein.

In further aspects, vehicles are provided that comprise a vehicle seat that includes a power swivel apparatus as disclosed herein.

In further aspects, vehicles are provided that comprise a power swivel apparatus as disclosed herein.

In certain aspects, a present vehicle may be an autonomous vehicle.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

As referred to herein, a monopost seat assembly or monopost seat or other similar term refers to a captain's-type vehicle seat rather than a bench-type vehicle seat or seat assembly. In certain aspects, a monopost vehicle seat may not have a seat-collapsing hinge as provided with a bench-type vehicle seat.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 4 is a plan view showing a state in which a middle gear is engaged with a lower gear in the configuration of the reduction gear device of the power swivel device for the seat according to the present disclosure;

FIG. 5 is a plan view showing a state in which an upper gear is engaged with the middle gear and the lower gear in the configuration of the reduction gear device of the power swivel device for the seat according to the present disclosure;

Figure 1:
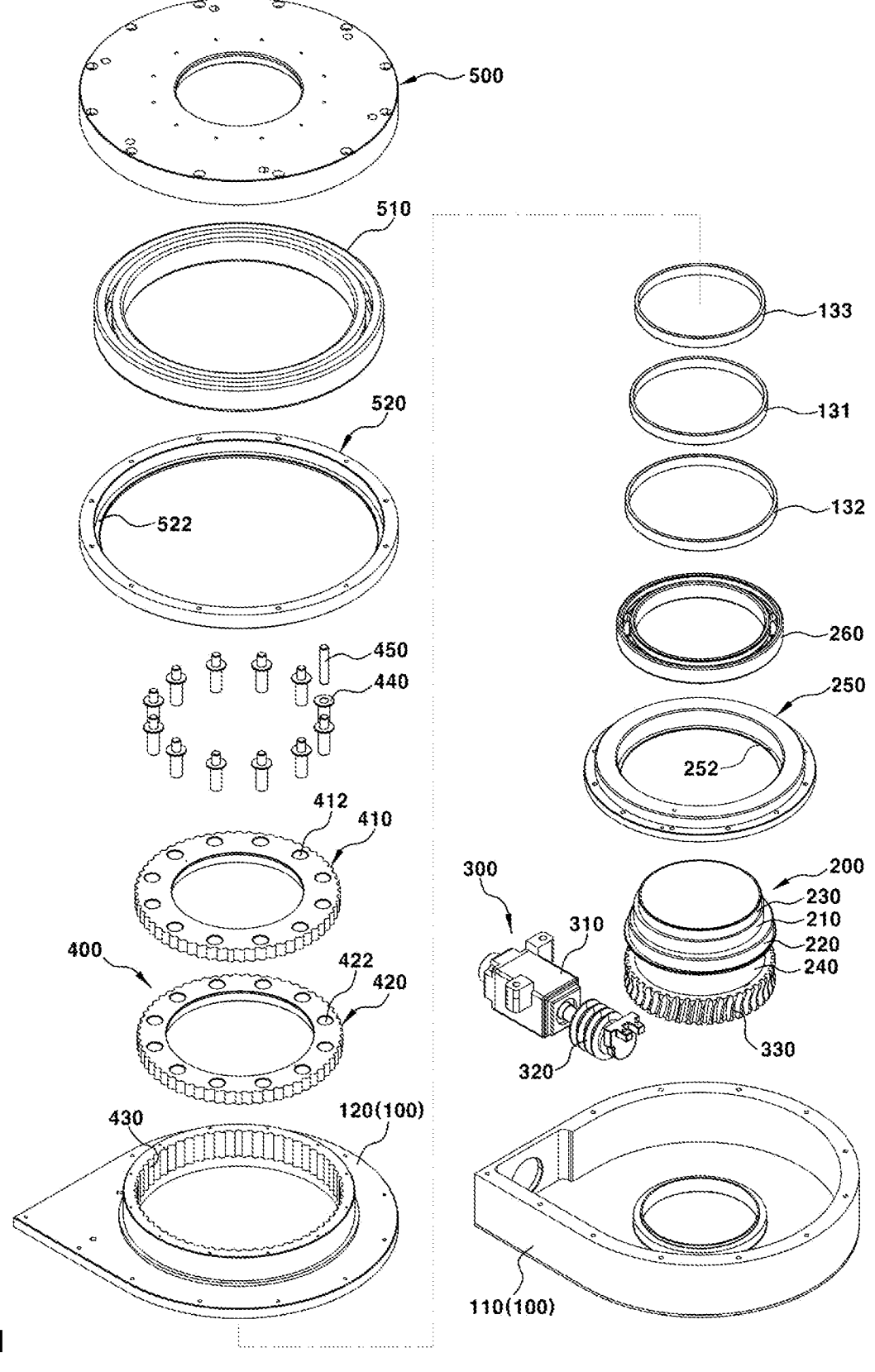
FIG. 1 is an exploded perspective view showing a power swivel device for a seat according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will be made in detail to various embodiments of the present disclosure, examples of which are illustrated in the accompanying drawings and described below. While the disclosure will be described in conjunction with exemplary embodiments, it will be understood that present description is not intended to limit the disclosure to the exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

Hereinafter, preferred embodiments of the present disclosure will be described in detail with reference to the accompanying drawings.

Figure 2:
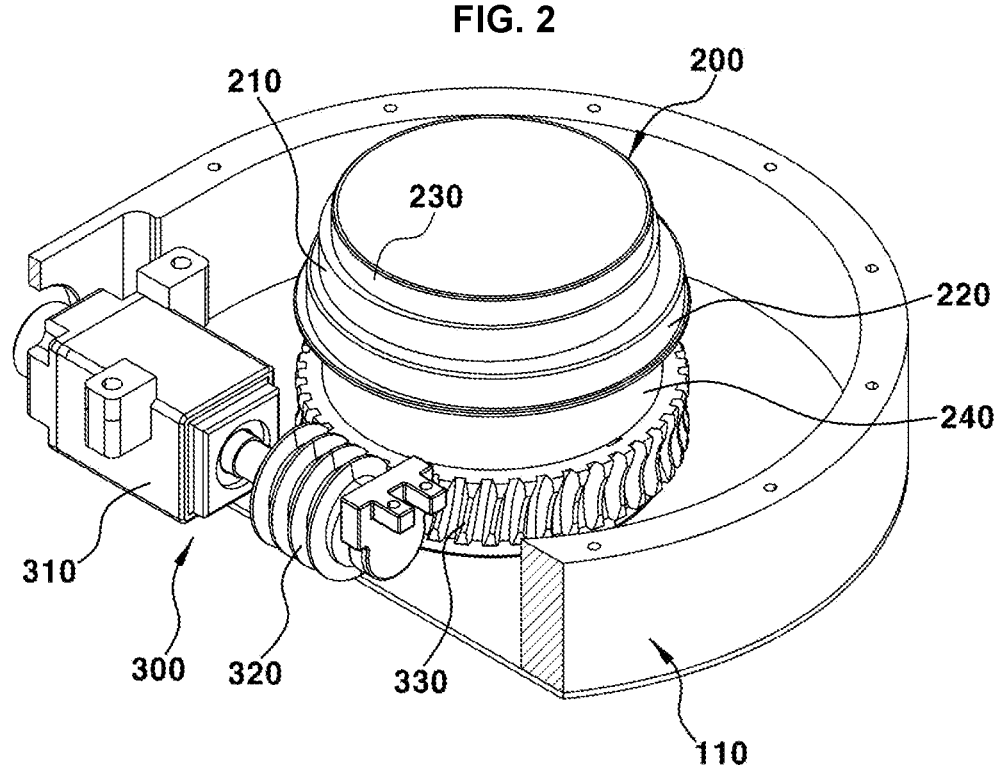
FIG. 2 is an assembled perspective view of a partial cross-section showing a motor driving unit of the power swivel device for the seat according to the present disclosure.
Figure 3:
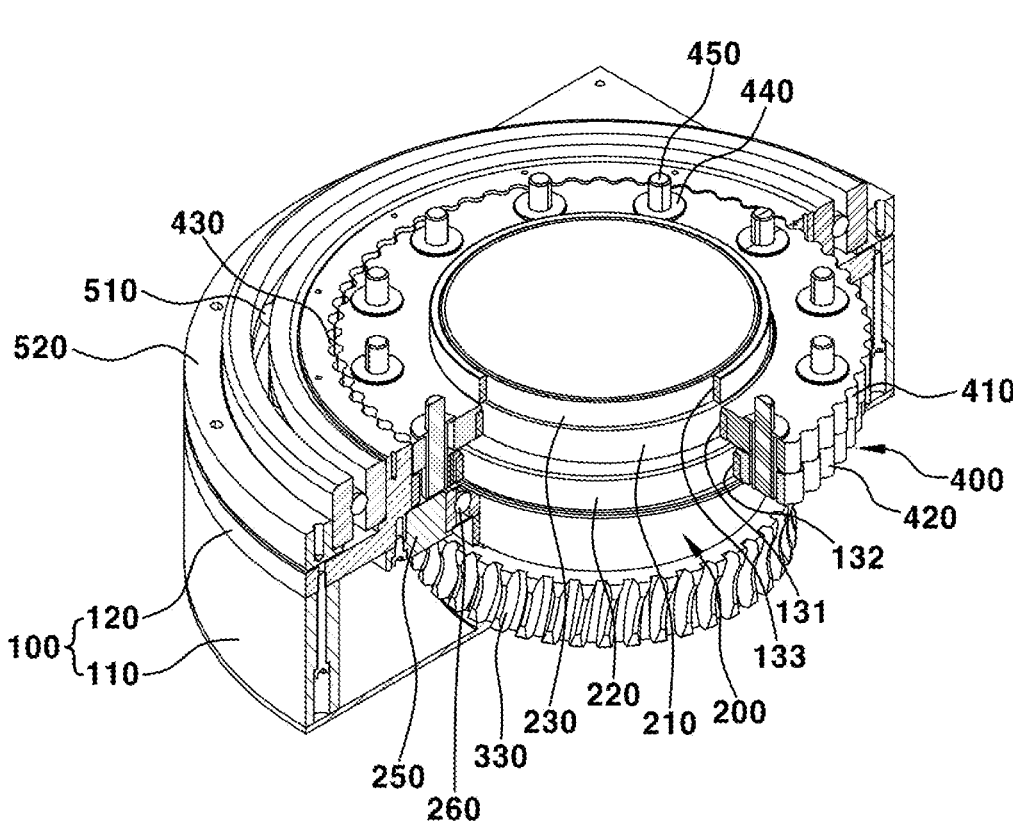
FIG. 3 is an assembled perspective view of a partial cross-section showing a state in which a reduction gear device is stacked on and assembled to the motor driving unit of the power swivel device for the seat according to the present disclosure.

FIG. 1 is an exploded perspective view showing a power swivel device for a seat according to the present disclosure, FIG. 2 shows a state in which a motor driving unit is assembled to a housing of the power swivel device for the seat according to the present disclosure, FIG. 3 shows a state in which a reduction gear device is assembled to the housing of the power swivel device for the seat according to the present disclosure, and reference numeral 100 in each drawing represents the housing.

The housing 100 includes a lower housing 110 mounted on an interior floor panel of a vehicle or mounted on a seat rail so as to be movable forwards and rearwards, and an upper housing 120 stacked on and coupled to the top of the lower housing 110.

Particularly, an eccentric shaft 200, a motor driving unit 300 configured to transmit power to the eccentric shaft 200, and a reduction gear device 400 configured to receive power from the eccentric shaft 200 are installed in the lower housing 110 and the upper housing 120.

The eccentric shaft 200 has a cylindrical body 240 rotatably disposed at the center of the lower housing 110 and the upper housing 120 as a skeleton body, and the same has a structure in which a circular part 230, a first eccentric part 210, and a second eccentric part 220 are sequentially formed from the top of the cylindrical body 240.

More specifically, the uppermost end of the cylindrical body 240 forming the skeleton of the eccentric shaft 200 is formed as the circular part 230, the first eccentric part 210 is formed to be integrated with the lower portion of the circular part 230 and is disposed at the outer diameter portion of the upper end of the cylindrical body 240, and the second eccentric part 220 is formed to be integrated with the lower portion of the first eccentric part 210 and is disposed at the outer diameter portion of the upper end of the cylindrical body 240.

Preferably, the outer diameter portion of the circular part 230 is smaller than that of the first eccentric part 210, and the outer diameter portion of the first eccentric part 210 is smaller than that of the second eccentric part 220.

Particularly, the first eccentric part 210 is formed to be eccentric in one direction from the center of the cylindrical body 240 in order to eccentrically rotate a first external gear 410 of the reduction gear device 400, and the second eccentric part 220 is formed to be eccentric in the other direction from the center of the cylindrical body 240 in order to eccentrically rotate a second external gear 420 of the reduction gear device 400.

Accordingly, the first eccentric part 210 is formed to be eccentric in one direction from the center of the cylindrical body 240, and the second eccentric part 220 is formed to be eccentric in the other direction from the center of the cylindrical body 240, thereby allowing the first external gear 410 inserted into the first eccentric part 210 and the second external gear 420 inserted into the second eccentric part 220 to be arranged eccentrically.

Preferably, the first eccentric part 210 has a first sleeve bearing 131 inserted into the outer diameter portion of the first eccentric part 210. Here, the first sleeve bearing 131 is in slide contact with the first external gear 410 to transmit eccentric rotational force. The second eccentric part 220 has a second sleeve bearing 132 inserted into the outer diameter portion of the second eccentric part 220. Here, the second sleeve bearing 132 is in slide contact with the second external gear 420 to transmit eccentric rotational force. The circular part 230 has a third sleeve bearing 133 inserted into the outer diameter portion of the third sleeve bearing 133. Here, the third sleeve bearing 133 is in slide contact with a swivel plate 500.

The motor driving unit 300 may be mounted between the lower housing 110 and the eccentric shaft 200 to rotationally drive the eccentric shaft 200.

To this end, as shown in FIG. 2, the motor driving unit 300 may include a motor 310 mounted in the lower housing 110, a worm 320, which is an output gear, mounted on the output shaft of the motor 310, and a worm wheel 330 mounted on the lower outer diameter portion of the cylindrical body 240 of the eccentric shaft 200 and engaged with the worm 320.

Accordingly, rotational force of the worm 320 according to the driving of the motor 310 is transmitted to the worm wheel 330, thereby making it possible to reliably rotate the eccentric shaft 200 having the worm wheel 330 mounted thereon.

The reduction gear device 400 may be mounted between the upper housing 120 and the eccentric shaft 200.

To this end, as shown in FIG. 3, the reduction gear device 400 may include the first external gear 410 inserted into and coupled to the first eccentric part 210 of the eccentric shaft 200, the second external gear 420 inserted into and coupled to the second eccentric part 220 of the eccentric shaft 200, and an internal gear 430 formed on the inner diameter portion of the upper housing 120 and simultaneously engaged with the first external gear 410 and the second external gear 420.

Substantially, the inner diameter portion of the first external gear 410 is in contact with the first sleeve bearing 131 inserted into the outer diameter portion of the first eccentric part 210, and the inner diameter portion of the second external gear 420 is in contact with the second sleeve bearing 132 inserted into the outer diameter portion of the second eccentric part 220.

In this case, the number of teeth of the first external gear 410 and the number of teeth of the second external gear 420 are formed to be smaller than the number of teeth of the internal gear 430, thereby enabling the first external gear 410 and the second external gear 420 to be eccentrically rotated along the internal gear 430.

Figure 4:
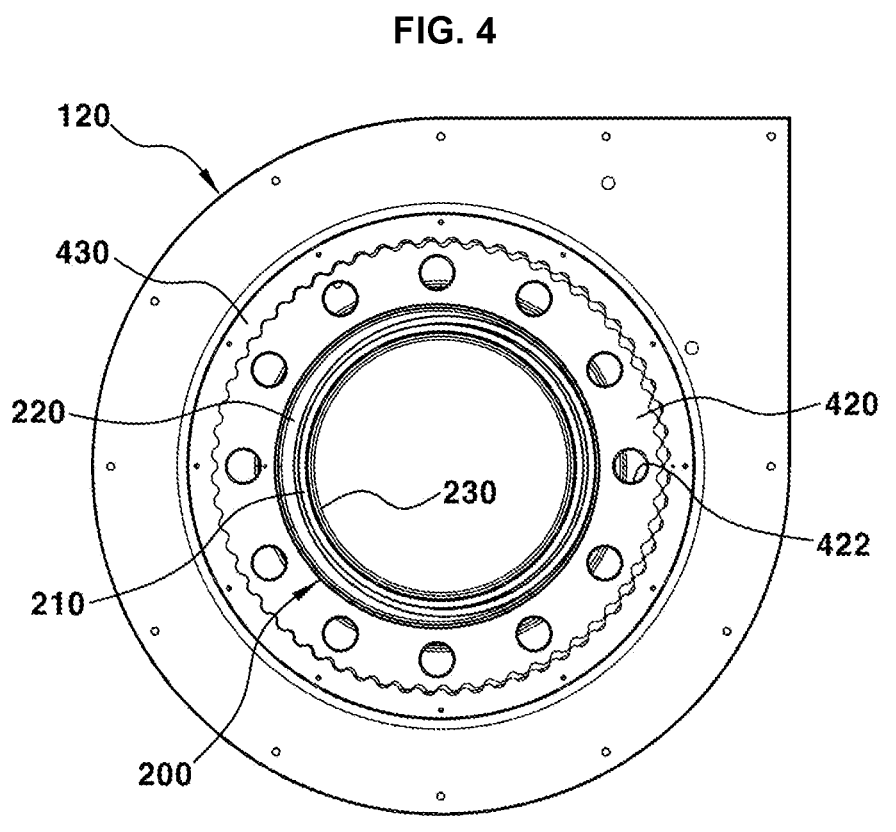
Figure 5:
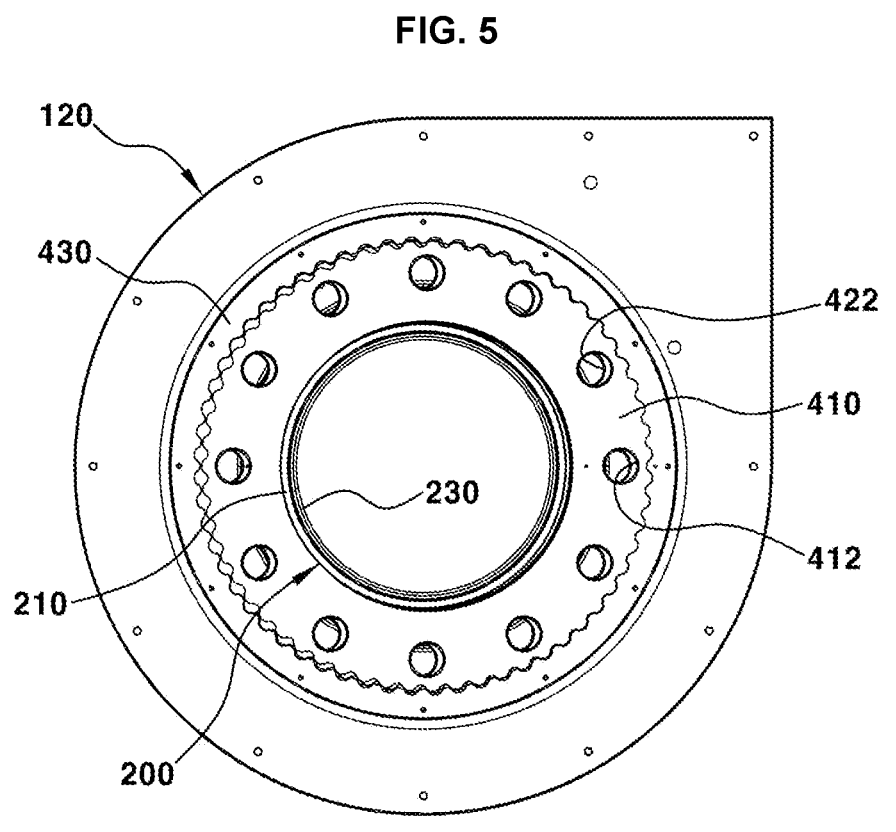

To this end, as shown in FIG. 4, the second external gear 420 is first inserted into and coupled to the second eccentric part 220 of the eccentric shaft 200 so as to be eccentrically disposed in one direction, and the same is also eccentrically and rotatably engaged with one part of the internal gear 430. Subsequently, as shown in FIG. 5, the first external gear 410 is inserted into and coupled to the first eccentric part 210 of the eccentric shaft 200 so as to be eccentrically disposed in the other direction, and the same is also eccentrically and rotatably engaged with the other part of the internal gear 430.

In other words, the first eccentric part 210 is formed to be eccentric in one direction from the center of the cylindrical body 240, and the second eccentric part 220 is formed to be eccentric in the other direction from the center of the cylindrical body 240, thereby enabling the first external gear 410 inserted into the first eccentric part 210 and the second external gear 420 inserted into the second eccentric part 220 to be disposed eccentrically to each other. Accordingly, a portion at which the first external gear 410 is engaged with the internal gear 430 and a portion at which the second external gear 420 is engaged with the internal gear 430 may be set to be different from each other.

In this case, the first external gear 410 inserted into and coupled to the first eccentric part 210 and the second external gear 420 inserted into and coupled to the second eccentric part 220 are stacked in the vertical direction while being disposed to be eccentric with each other, and the same are coupled to each other by a hollow fixation pin 440 and a rotation transmission pin 450.

To this end, the first external gear 410 and the second external gear 420 respectively have a plurality of first coupling holes 412 and a plurality of second coupling holes 422 formed at regular intervals in the circumferential direction and formed to match each other so as to communicate with each other in the vertical direction.

Accordingly, in a state in which the first external gear 410 inserted into and coupled to the first eccentric part 210 and the second external gear 420 inserted into and coupled to the second eccentric part 220 are eccentric with each other and are stacked in the vertical direction, the hollow fixation pin 440 is first inserted into and coupled to the first coupling hole 412 and the second coupling hole 422 formed to match each other so as to communicate with each other in the vertical direction, and the first external gear 410 and the second external gear 420 are coupled to each other.

Subsequently, the rotation transmission pin 450 is inserted into and coupled to the hollow fixation pin 440, and the upper end of the rotation transmission pin 450 is disposed to protrude upwards from the first external gear 410. In this manner, the upper end of the rotation transmission pin 450 is coupled to the swivel plate 500 so as to transmit rotational force thereto.

In this case, the upper housing 120 has a ring-shaped support plate 250 disposed on the lower surface of the upper housing 120, configured to support the bottom of the second external gear 420, and spaced apart from the outer diameter portion of the eccentric shaft 200 by a predetermined distance. Accordingly, the ring-shaped support plate 250 has a function of supporting the load of the first external gear 410 and the second external gear 420, thereby preventing the first external gear 410 and the second external gear 420 from deviating in the downward direction.

Particularly, a second ball bearing 260 is mounted between the outer diameter portion of the eccentric shaft 200, that is, the outer diameter portion of the cylindrical body 240 directly below the second eccentric part 220, and the inner diameter portion of the support plate 250. Accordingly, rotation of the eccentric shaft 200 may be smoothly performed by guidance of the second ball bearing 260.

Preferably, the support plate 250 has a second support end 252 formed to be integrated with the bottom inner diameter portion of the support plate 250 and configured to support the bottom of the second ball bearing 260, thereby stably fixing the position of the second ball bearing 260 and preventing the second ball bearing 260 from deviating in the downward direction.

Therefore, when rotational force of the worm 320 according to the driving of the motor 310 is transmitted to the worm wheel 330 and the eccentric shaft 200 is rotated, the first eccentric part 210 and the second eccentric part 220 are eccentrically rotated. At this time, the second external gear 420 is engaged with one part of the internal gear 430 so as to be eccentrically rotated by eccentric rotation of the second eccentric part 220, and the first external gear 410 is engaged with the other part of the internal gear 430 so as to be eccentrically rotated by eccentric rotation of the first eccentric part 210.

Preferably, when the eccentric shaft 200 is rotated once by the driving of the motor 310, the first external gear 410 may be rotated by 1/the number of teeth of the first external gear, and the second external gear 420 may also be rotated by 1/the number of teeth of the second external gear.

In this manner, when the eccentric shaft 200 is continuously rotated by the driving of the motor 310, the second external gear 420 is eccentrically rotated while being engaged with one part of the internal gear 430, and simultaneously, the first external gear 410 is eccentrically rotated while being engaged with the other part of the internal gear 430, thereby making it possible not only to reliably increase output torque of the motor 310 to swivel a vehicle seat, but also to transmit the increased output torque to the swivel plate 500 through the rotation transmission pin 450.

Figure 6:
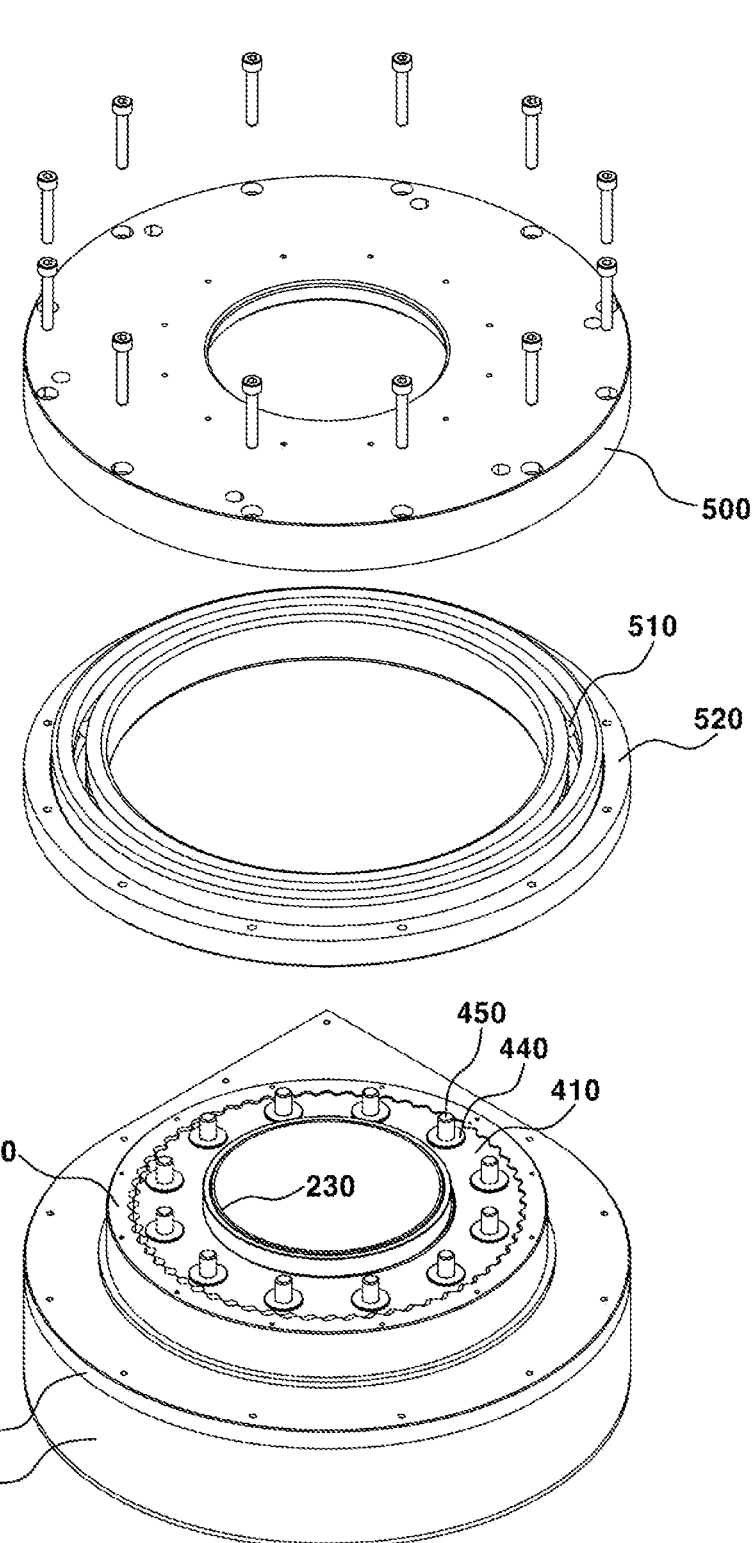
FIG. 6 is a perspective view showing that a swivel plate configured to transmit rotational force to a seat cushion frame is assembled onto the reduction gear device of the power swivel device for the seat according to the present disclosure.
Figure 7:
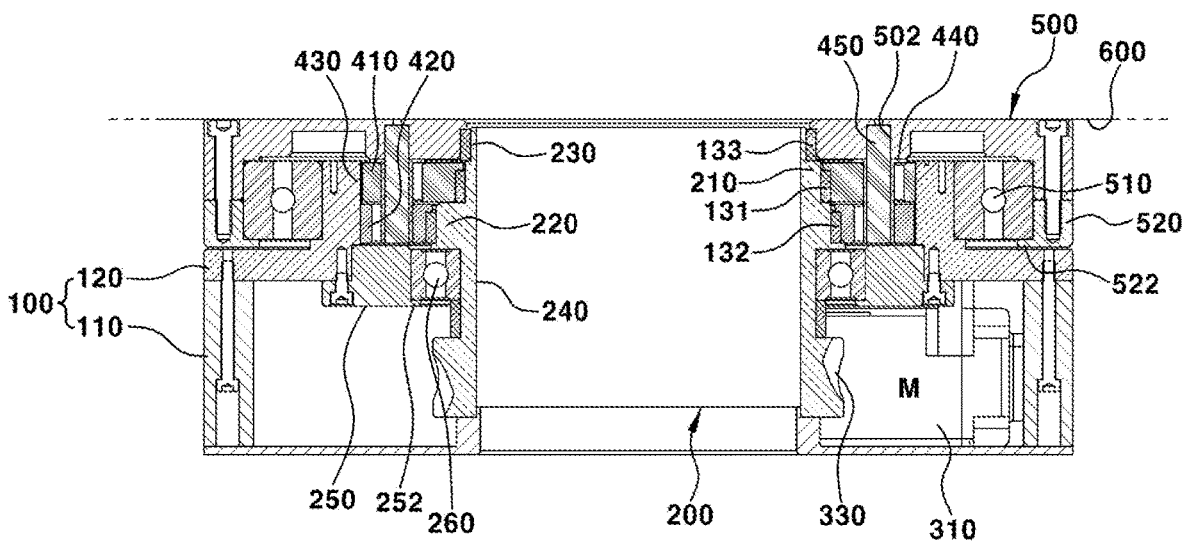
FIG. 7 is a cross-sectional view showing the entire assembled state of the power swivel device for the seat according to the present disclosure.

As shown in FIGS. 6 and 7, the swivel plate 500 is rotatably mounted on the output part of the reduction gear device 400, and a seat cushion frame 600 to be swiveled is placed on and coupled to the upper portion of the swivel plate 500.

Accordingly, the swivel plate 500 may be rotated by the output torque of the motor increased by the reduction gear device 400, and simultaneously, the seat cushion frame 600 may be swiveled.

To this end, as shown in FIG. 7, the swivel plate 500 has a rotation transmission groove 502 formed on the lower surface of the swivel plate 500 and configured to allow the upper end of the rotation transmission pin 450 protruding upwards from the first external gear 410 of the reduction gear device 400 to be inserted thereinto and coupled thereto.

Therefore, when the swivel plate 500 is stacked on the upper housing 120 and the first external gear 410 in a state where the rotation transmission pin 450 protrudes upwards from the first external gear 410, the rotation transmission pin 450 is inserted into and coupled to the rotation transmission groove 502 of the swivel plate 500. Accordingly, the swivel plate 500 may be rotated by rotation of the rotation transmission pin 450, and the seat cushion frame 600 may be swiveled by rotation of the swivel plate 500.

In this case, when the swivel plate 500 is swiveled, the inner diameter portion of the swivel plate 500 toward the center of the lower surface of the swivel plate 500 is slidably in contact with the third sleeve bearing 133 inserted into the outer diameter portion of the circular part 230 of the eccentric shaft 200.

Meanwhile, the swivel plate 500 has a lower cover 520 further mounted on the lower surface of the edge of the swivel plate 500 and configured to rotatably contact the outer upper surface of the upper housing 120. Accordingly, the lower cover 520 has a function of not only eliminating vertical play between the swivel plate 500 and the upper housing 120 but also providing a mounting space for a first ball bearing 510 configured to guide rotation of the swivel plate 500.

Therefore, as shown in FIG. 7, the first ball bearing 510 configured to guide rotation of the swivel plate 500 and the lower cover 520 may be reliably mounted between the inner diameter portion of the swivel plate 500 and the lower cover 520 and the outer diameter portion of the upper housing 120.

Preferably, the lower inner diameter portion of the lower cover 520 and the lower outer diameter portion of the upper housing 120 are formed to be integrated with a first support end 522 configured to support the lower surface of the first ball bearing 510, thereby reliably fixing the position of the first ball bearing 510.

The eccentric shaft 200, the motor driving unit 300 configured to transmit power to the eccentric shaft 200, and the reduction gear device 400 configured to increase output torque of the motor by receiving power from the eccentric shaft 200 are installed in the housing 100, and the swivel plate 500 connected to the output part of the reduction gear device 400 is stacked on and assembled to the housing 100, thereby enabling the housing 100 and the swivel plate 500 to be formed as a monopost of a seat in appearance.

Figure 8:
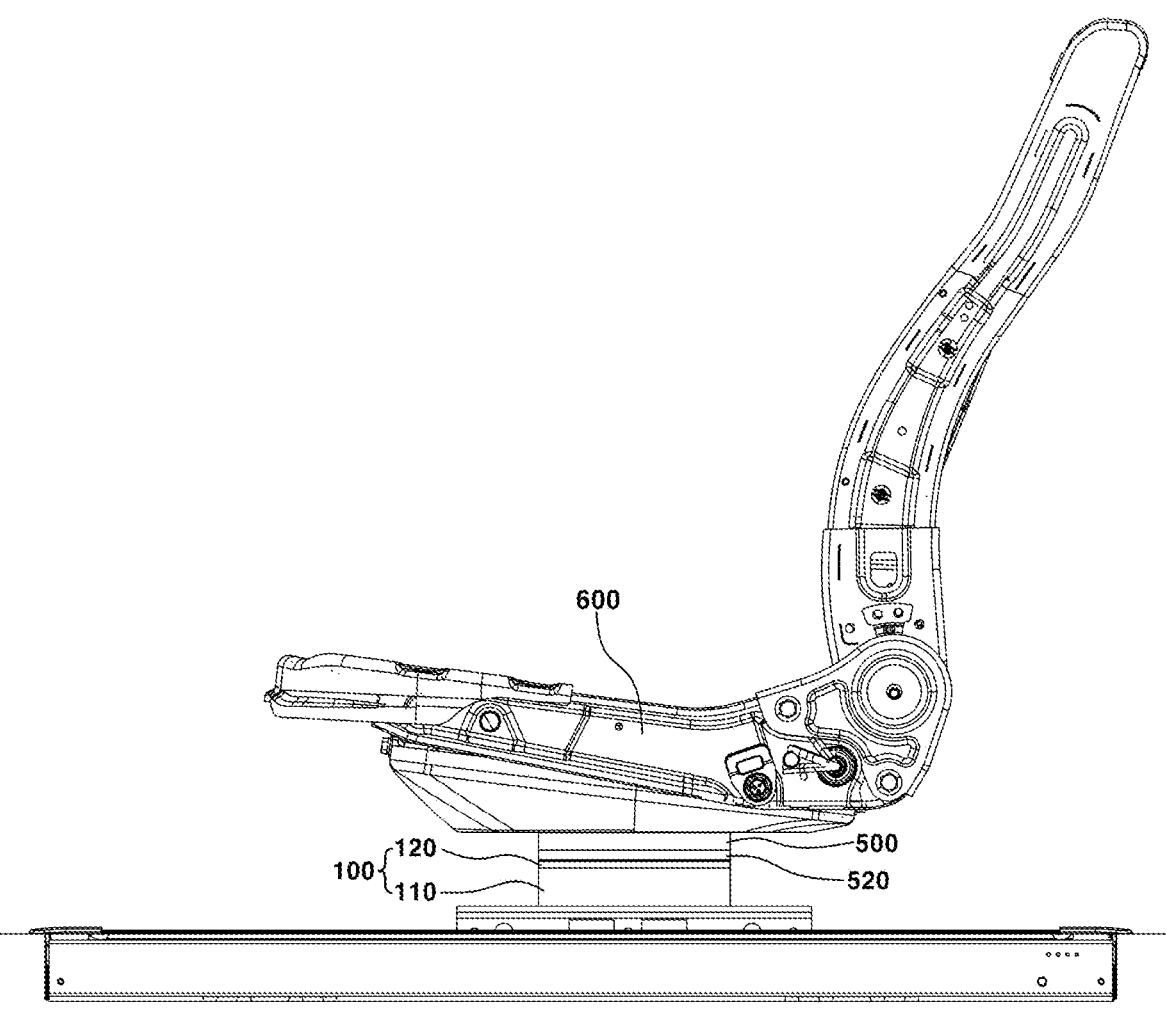
FIG. 8 is a side view showing a state in which the power swivel device for the seat according to the present disclosure is mounted on the bottom of the seat cushion frame in the form of a monopost.

In detail, as shown in FIG. 8, the housing 100 in which the eccentric shaft 200, the motor driving unit 300, and the reduction gear device 400 are installed and the swivel plate 500 rotatably stacked on the housing 100 are formed as a monopost of a seat in appearance, thereby making it possible not only to secure a sufficiently flattened space of a floor panel, but also to improve user convenience in the interior of the vehicle.

Hereinafter, a description will be given as to an operation flow of the power swivel device for the seat according to the present disclosure having the above-described configuration.

First, rotational force of the worm 320 according to the driving of the motor 310 is transmitted to the worm wheel 330, thereby rotating the eccentric shaft 200 having the worm wheel 330 mounted thereon.

At the same time, when the eccentric shaft 200 is rotated, the first eccentric part 210 and the second eccentric part 220 are eccentrically rotated.

In this case, the reduction gear device 400 operates to increase output torque of the motor by eccentric rotation of the first eccentric part 210 and the second eccentric part 220.

To this end, the second external gear 420 is eccentrically rotated while being engaged with one part of the internal gear 430 by eccentric rotation of the second eccentric part 220, and simultaneously, the first external gear 410 is eccentrically rotated while being engaged with the other part of the internal gear 430 by eccentric rotation of the first eccentric part 210.

Preferably, when the eccentric shaft 200 is rotated once, the first external gear 410 is rotated by 1/the number of teeth of the first external gear, and simultaneously, the second external gear 420 is rotated by 1/the number of teeth of the second external gear.

Accordingly, when the eccentric shaft 200 is continuously rotated, the second external gear 420 is eccentrically rotated while being engaged with one part of the internal gear 430, and the first external gear 410 is eccentrically rotated while being engaged with the other part of the internal gear 430, thereby reliably increasing output torque of the motor 310 to swivel a vehicle seat.

In this case, the output torque of the motor increased by the reduction gear device 400 may be transmitted to the swivel plate 500 through the rotation transmission pin 450.

More specifically, since the rotation transmission pin 450 is in a state of being inserted into and coupled to the rotation transmission groove 502 of the swivel plate 500, the swivel plate 500 may be rotated by rotation of the rotation transmission pin 450, and the seat cushion frame 600 may be swiveled by rotation of the swivel plate 500.

Accordingly, the seat cushion frame 600 stacked on and assembled to the swivel plate 500 is rotated with the swivel plate 500, thereby performing a swivel function of a seat.

In this manner, the seat may be easily swiveled to a desired position without interfering with peripheral parts for multilateral meetings and talks, relaxation and sleeping, and assistance in entering and exiting the vehicle in the limited interior space of the vehicle.

As is apparent from the above description, the present disclosure provides the following effects.

First, it is possible to reliably swivel a seat to a desired position without interfering with peripheral parts for multilateral meetings and conversations between occupants, relaxation and sleeping, and assistance in entering and exiting the vehicle in the limited interior space of the vehicle.

Secondly, a swivel device for the seat performs a mono-post function, thereby making it possible not only to secure a sufficiently flattened space of a floor panel, but also to improve user convenience in the interior of the vehicle.

Third, a reduction gear device is connected to an eccentric shaft of a motor, thereby enabling gears of the reduction gear device to reliably improve output torque of the motor to swivel the seat while being eccentrically rotated.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and equivalents thereto.

What is claimed is:

1. A power swivel device for a vehicle seat, the power swivel device comprising:
a lower housing;
an upper housing stacked on and assembled to the lower housing;
an eccentric shaft rotatably disposed relative to the lower housing and the upper housing;
a motor driving unit mounted between the lower housing and the eccentric shaft;
a reduction gear device installed between the upper housing and the eccentric shaft; and
a swivel plate rotatably mounted on the reduction gear device and connected to a seat cushion frame,
wherein the eccentric shaft comprises:
a cylindrical body;
a circular part formed at an uppermost end of the cylindrical body;
a first eccentric part formed to be integrated with an outer diameter portion of the cylindrical body and located below the circular part; and
a second eccentric part formed to be integrated with the outer diameter portion of the cylindrical body and located below the first eccentric part.

2. The power swivel device of claim 1, wherein the eccentric shaft is rotatably disposed at a central portion of the lower housing and the upper housing.

3. The power swivel device of claim 1, wherein the swivel plate includes upper and lower portions, the upper portion being connected to a seat cushion frame, and the lower portion rotatably mounted on an output part of the reduction gear device.

4. The power swivel device of claim 1, wherein the first eccentric part is formed to be eccentric in one direction from a central portion of the cylindrical body, and the second eccentric part is formed to be eccentric in the other direction from the central portion of the cylindrical body.

5. The power swivel device of claim 1, wherein the first eccentric part has a first sleeve bearing inserted into an outer diameter portion of the first eccentric part, the second eccentric part has a second sleeve bearing inserted into an outer diameter portion of the second eccentric part, and the circular part has a third sleeve bearing inserted into an outer diameter portion of the circular part.

6. The power swivel device of claim 1, wherein the motor driving unit comprises:
a motor mounted in the lower housing;
a worm mounted on an output shaft of the motor; and
a worm wheel mounted on an outer diameter portion of a lower end of the eccentric shaft and engaged with the worm.

7. A vehicle comprising the power swivel device of claim 1.

8. A power swivel device for a vehicle seat, the power swivel device comprising:
a lower housing;
an upper housing stacked on and assembled to the lower housing;
an eccentric shaft rotatably disposed relative to the lower housing and the upper housing;
a motor driving unit mounted between the lower housing and the eccentric shaft;
a reduction gear device installed between the upper housing and the eccentric shaft; and
a swivel plate rotatably mounted on the reduction gear device and connected to a seat cushion frame,
wherein the reduction gear device comprises:
a first external gear inserted into and coupled to a first eccentric part of the eccentric shaft;
a second external gear inserted into and coupled to a second eccentric part of the eccentric shaft; and
an internal gear formed on an inner diameter portion of the upper housing and engaged with the first external gear and the second external gear.

9. The power swivel device of claim 8, wherein the first external gear inserted into and coupled to the first eccentric part and the second external gear inserted into and coupled to the second eccentric part are stacked and coupled eccentrically to each other so that a portion of the first external gear, the portion being engaged with the internal gear, and a portion of the second external gear, the portion being engaged with the internal gear, are different from each other.

10. The power swivel device of claim 9, wherein the first external gear has a plurality of first coupling holes formed therein, and the second external gear has a plurality of second coupling holes formed therein, wherein the first coupling holes and the second coupling holes match each other in a vertical direction, and wherein the first coupling holes and the second coupling holes have hollow fixation pins respectively inserted thereinto and coupled thereto.

11. The power swivel device of claim 10, wherein the hollow fixation pins have rotation transmission pins respectively inserted thereinto and coupled thereto, and the rotation transmission pins respectively have upper ends arranged so as to protrude upwards from the first external gear.

12. The power swivel device of claim 8, wherein the upper housing has a ring-shaped support plate mounted on a lower surface of the upper housing and configured to support a bottom of the second external gear, wherein the support plate is spaced apart from an outer diameter portion of the eccentric shaft by a predetermined distance.

13. The power swivel device of claim 12, wherein a second ball bearing is mounted between the outer diameter portion of the eccentric shaft and an inner diameter portion of the support plate.

14. The power swivel device of claim 13, wherein the support plate has a second support end formed to be integrated with the inner diameter portion of a lower end of the support plate and configured to support a bottom of the second ball bearing.

15. The power swivel device of claim 14, wherein the swivel plate includes upper and lower portions, wherein the lower portion of the swivel plate is rotatably mounted on the reduction gear device and the upper portion is connected to the seat cushion frame.

16. The power swivel device of claim 15, wherein the swivel plate has a rotation transmission groove formed on a lower surface of the swivel plate and configured to allow an upper end of a rotation transmission pin to be inserted thereinto and coupled thereto, wherein the rotation transmission pin is formed to protrude upwards from a first external gear of the reduction gear device.

17. The power swivel device of claim 16, wherein the swivel plate has a lower cover mounted on the lower surface of an edge portion of the swivel plate and configured to rotatably contact an upper surface of the upper housing.

18. The power swivel device of claim 17, wherein a first ball bearing is mounted between inner diameter portions of the swivel plate and the lower cover and an outer diameter portion of the upper housing, wherein the first ball bearing guides rotation of the swivel plate and rotation of the lower cover.

19. The power swivel device of claim 18, wherein the lower cover has a first support end formed to be integrated with the inner diameter portion of a lower portion of the lower cover and configured to support a lower surface of the first ball bearing.

\* \* \* \* \*